US012576828B2

(12) United States Patent
Brandt et al.

(10) Patent No.: US 12,576,828 B2
(45) Date of Patent: Mar. 17, 2026

(54) BRAKE-SYSTEM TEMPERATURE MONITORING WITH WARNING AND VEHICLE CONTROL

(71) Applicant: Polaris Industries Inc., Medina, MN (US)

(72) Inventors: Brian Brandt, Roseau, MN (US); Cody Kofstad, Warroad, MN (US); Timothy R. Heffron, Salol, MN (US); Eric Borud, Roseau, MN (US); Jeffrey Nels Johnson, Warroad, MN (US); Luke Guderjohn, Roseau, MN (US); Tyler D. Bentow, Roseau, MN (US); Dallas Blake, Roseau, MN (US); Jeremy Allen Hughes, Roseau, MN (US); Ryan Douglas Hayes, East Grand Forkes, MN (US); Cole Maxwell, Badger, MN (US); James P. Palminteri, Salol, MN (US); Marshall E. Hahn, Warroad, MN (US); Joseph D. Tharaldson, Taylor Falls, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/609,359

(22) Filed: Mar. 19, 2024

(65) Prior Publication Data

US 2024/0317207 A1 Sep. 26, 2024

Related U.S. Application Data

(60) Provisional application No. 63/453,769, filed on Mar. 22, 2023.

(51) Int. Cl.
*B60W 10/18* (2012.01)
*B60W 50/14* (2020.01)

(52) U.S. Cl.
CPC ............ *B60W 10/18* (2013.01); *B60W 50/14* (2013.01)

(58) Field of Classification Search
CPC ..... B60W 50/14; B60W 10/18; F16D 66/027; F16D 66/02; F16D 2066/001;
(Continued)

(56) References Cited

U.S. PATENT DOCUMENTS

| | | | |
|---|---|---|---|
| 5,637,794 A | 6/1997 | Hanisko | |
| 7,523,811 B2 | 4/2009 | Pacchiana et al. | |

(Continued)

FOREIGN PATENT DOCUMENTS

| | | |
|---|---|---|
| WO | WO9200212 | 1/1992 |

*Primary Examiner* — Hai H Huynh
*Assistant Examiner* — Johnny H Hoang
(74) *Attorney, Agent, or Firm* — Merchant & Gould P.C.

(57) ABSTRACT

A snowmobile warning and control method for a snowmobile having an engine and a brake system, including: sensing a temperature of the brake system of the vehicle; determining that the temperature of the brake system is above a first predetermined temperature threshold; issuing a first brake-system temperature warning in response to the temperature of the brake system exceeding the first predetermined temperature threshold; determining that the temperature of the brake system is above a second predetermined temperature, the second predetermined temperature being greater than the first predetermined temperature; issuing a second brake-system temperature warning in response to the temperature of the brake system exceeding the second predetermined temperature threshold; and modifying an operation of the engine in response to the temperature of the brake system exceeding the second predetermined temperature threshold.

17 Claims, 10 Drawing Sheets

(58) Field of Classification Search
CPC .... F16D 66/00; F16D 2066/005; B60T 17/22;
B60T 8/268; B60T 2270/604; B60T
2220/04; B60T 2270/88; B60T 2250/04;
B60T 2210/30; B60T 2230/02; B60L
7/26; B62L 3/023; B62J 6/24; B62J 3/14
USPC ...................................................... 701/71–81
See application file for complete search history.

(56) References Cited

U.S. PATENT DOCUMENTS

| | | | |
|---|---|---|---|
| 8,437,934 B2 | 5/2013 | Degenstein | |
| 8,590,654 B2 | 11/2013 | Kerner et al. | |
| 8,733,773 B2 | 5/2014 | Sampson | |
| 11,110,994 B2 | 9/2021 | Hedlund et al. | |
| 11,401,695 B2 * | 8/2022 | Hyodo ..................... | F01P 11/14 |
| 11,787,381 B1 * | 10/2023 | Zhang ..................... | B60T 17/22 |
| | | | 188/1.11 R |
| 12,319,257 B2 * | 6/2025 | Fagergren ............... | F16D 66/00 |
| 2008/0270074 A1 * | 10/2008 | Horkavi ................. | G07C 5/008 |
| | | | 702/182 |
| 2011/0054758 A1 * | 3/2011 | Bae ......................... | F16D 66/00 |
| | | | 701/92 |
| 2013/0187353 A1 * | 7/2013 | Mock .................... | B60T 13/662 |
| | | | 280/80.1 |
| 2014/0332293 A1 | 11/2014 | Conn | |
| 2015/0120163 A1 * | 4/2015 | Ohara .................... | B60T 7/108 |
| | | | 701/70 |
| 2015/0145703 A1 * | 5/2015 | Martin ................... | B64D 45/00 |
| | | | 340/960 |
| 2016/0334790 A1 * | 11/2016 | Rust ...................... | B60T 13/662 |
| 2017/0082164 A1 * | 3/2017 | Serra ..................... | F16D 65/092 |
| 2020/0040956 A1 * | 2/2020 | Cremona ............. | F16D 66/027 |
| 2021/0214044 A1 | 7/2021 | Krings et al. | |
| 2023/0256955 A1 * | 8/2023 | Yilmaz .................. | B60T 17/22 |
| | | | 303/191 |
| 2023/0358287 A1 * | 11/2023 | Boncha .................. | F16D 66/00 |
| 2023/0398877 A1 * | 12/2023 | Kwong ................. | F16D 66/00 |

* cited by examiner

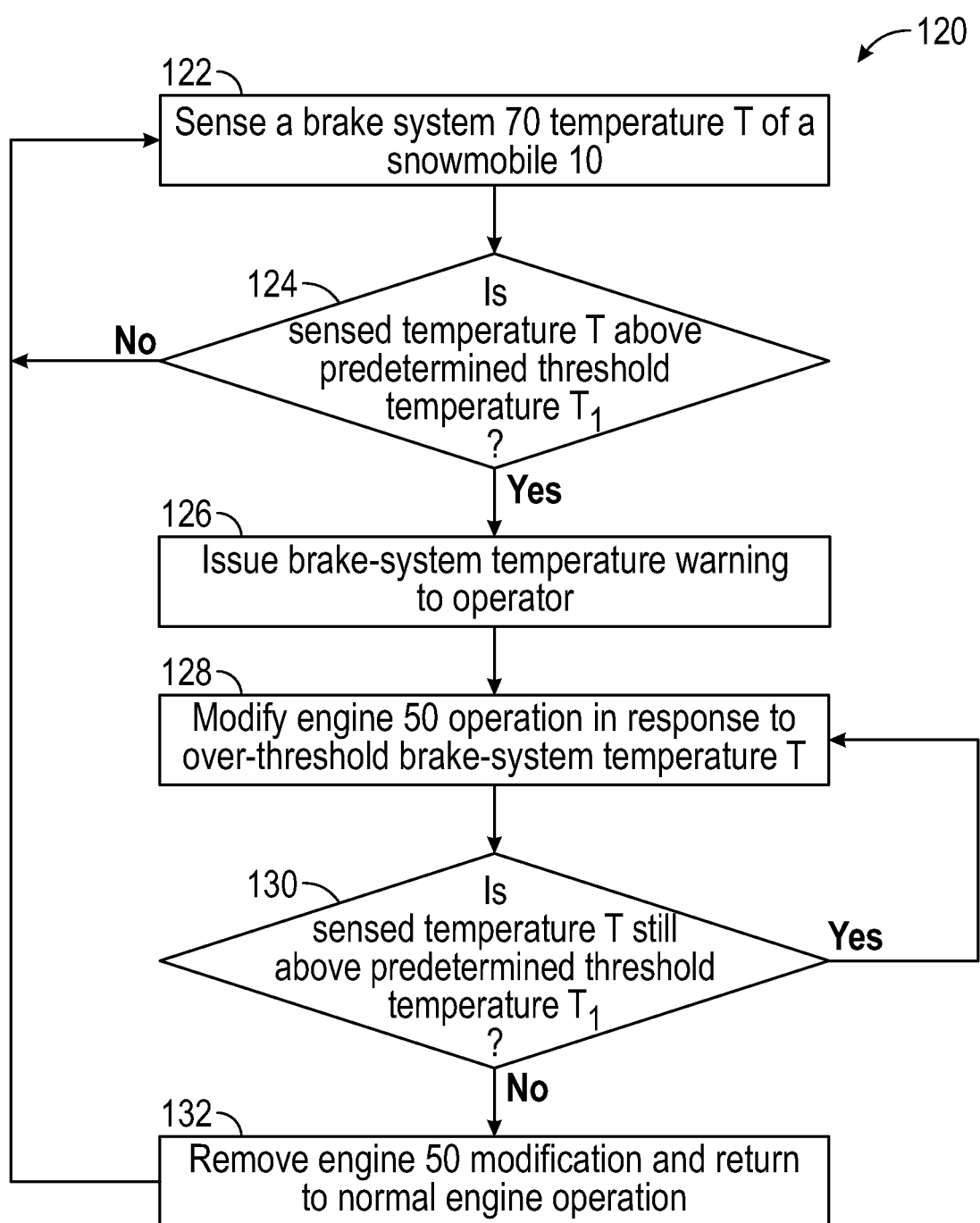

120

122 — Sense a brake system 70 temperature T of a snowmobile 10

124 — Is sensed temperature T above predetermined threshold temperature $T_1$ ?

No

Yes

126 — Issue brake-system temperature warning to operator

128 — Modify engine 50 operation in response to over-threshold brake-system temperature T 130 — Is sensed temperature T still above predetermined threshold temperature $T_1$ ?

Yes

No

132 — Remove engine 50 modification and return to normal engine operation

FIG. 9

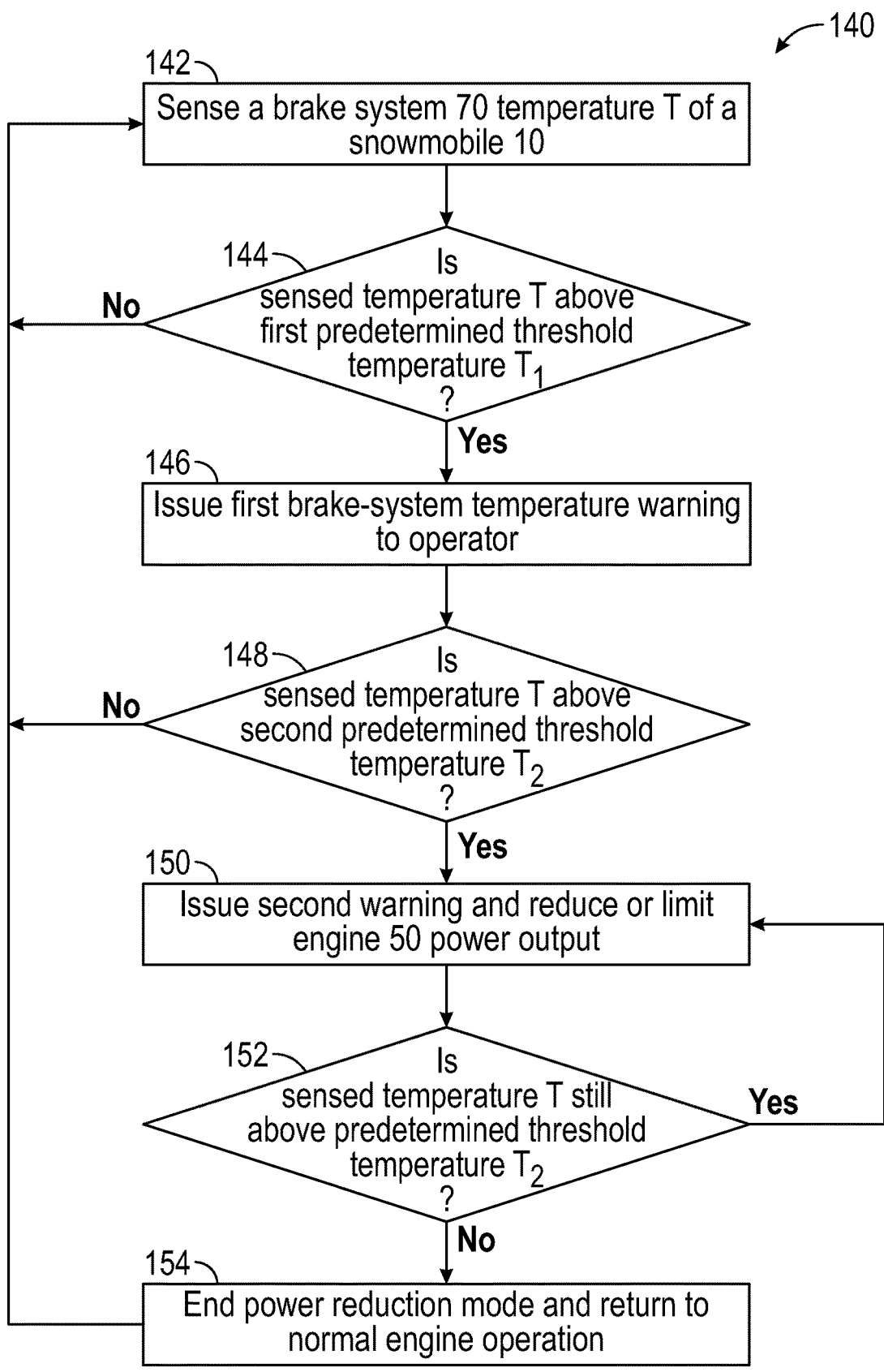

140

142 —
Sense a brake system 70 temperature T of a snowmobile 10

144 —
Is sensed temperature T above first predetermined threshold temperature T₁?

No

Yes

146 —
Issue first brake-system temperature warning to operator

148 —
Is sensed temperature T above second predetermined threshold temperature T₂?

No

Yes

150 —
Issue second warning and reduce or limit engine 50 power output

152 —
Is sensed temperature T still above predetermined threshold temperature T₂?

Yes

No

154 —
End power reduction mode and return to normal engine operation

FIG. 10

BRAKE-SYSTEM TEMPERATURE MONITORING WITH WARNING AND VEHICLE CONTROL

RELATED APPLICATIONS

This application claims priority to U.S. Provisional Application No. 63/453,769 filed on Mar. 22, 2023, entitled Brake-System Temperature Monitoring With Warning and Vehicle Control, the contents of which is expressly incorporated by reference herein.

FIELD OF THE DISCLOSURE

This disclosure relates generally to monitoring brake-system temperatures of vehicles. More specifically this disclosure relates to warning operators of vehicles about brake-system temperatures and controlling vehicle systems in response to the sensed brake-system temperatures.

BACKGROUND

Vehicles generally include brake systems for reducing the speed of the vehicle. Such braking systems are often hydraulic disc-brake systems, which are generally manually actuated by an operator of the vehicle, such as by pulling a lever or pressing a brake pedal. Effective braking function of such vehicle brake systems can be affected by many factors, including the external environment in which the vehicle is operated, whether the vehicle and its systems are in proper working condition, how the vehicle is being operated, and so on. Such factors may affect brake-system temperature, which in turn affects brake-system functioning. Unusually high temperatures of a brake system and its components, such as brake rotors, brake calipers, and/or brake fluid, can result in a reduction of brake-system function.

In the case of snowmobiles in particular, a high brake-system temperature might not be immediately noticeable to an operator riding the snowmobile in a cold-weather environment.

SUMMARY

Embodiments of the present disclosure monitor and sense brake-system temperatures, and warn an operator of a snowmobile of a high brake-system temperature. In some embodiments, engine power may be limited or reduced without operator input to alleviate the high-temperature condition.

Embodiments of the present disclosure include a brake monitoring and sensing system that includes a temperature sensor in communication with an engine control monitor (ECM) of the snowmobile or vehicle. In an embodiment, based upon the detected temperature of the brake system, the ECM will cause the vehicle to be in one of various operating modes, including a normal mode, a warning mode, a power-limited mode or an engine-shut-down mode.

If the brake-system temperature is within temperature bounds defined as normal operation, the ECM will allow full vehicle function and engine power such that the vehicle will function as normal, i.e., in a "normal" operating mode.

If the brake-system temperature becomes elevated above a first threshold temperature beyond the bounds defined as normal operation, the ECM will cause a warning to be issued to the operator to notify the operator that the brake-system temperature is elevated beyond normal. The warning may take various forms, including visual indications, such as turning on indicator lights or providing informational messages or data, on the vehicle display. Warning may also be audible or haptic. In this warning mode, full engine power may be available to the operator.

If the brake-system temperature continues to rise, and surpasses a second threshold temperature, the ECM, in addition to providing a warning, may set the vehicle engine into a power-limited mode. Reducing engine power will generally reduce vehicle speed and may also reduce brake-system temperatures and prevent engine damage.

If the brake-system temperature continues to rise, and surpasses a third threshold temperature, the ECM will shut down the engine.

An embodiment of the disclosure includes a snowmobile warning and control method for a snowmobile having an engine and a brake system. The method includes sensing a temperature of the brake system of the vehicle; determining that the temperature of the brake system is above a first predetermined temperature threshold; issuing a first brake-system temperature warning in response to the temperature of the brake system exceeding the first predetermined temperature threshold; determining that the temperature of the brake system is above a second predetermined temperature, the second predetermined temperature being greater than the first predetermined temperature; issuing a second brake-system temperature warning in response to the temperature of the brake system exceeding the second predetermined temperature threshold; and modifying an operation of the engine in response to the temperature of the brake system exceeding the second predetermined temperature threshold.

Another embodiment is a vehicle warning and control method for a vehicle having an engine and a brake system, the method comprising: sensing a temperature of the brake system of the vehicle; determining that the temperature of the brake system is above a first predetermined temperature threshold; sensing an operator-controlled vehicle function; issuing a first brake-system temperature warning in response to the temperature of the brake system exceeding the first predetermined temperature threshold; determining whether the sensed operator-controlled vehicle function has been changed by the operator; and issuing a second brake-system temperature warning after a predetermined period of time and after determining whether the operator-controlled function has been changed by the operator.

Another embodiment is a snowmobile warning and control method for a vehicle having an engine and a brake system. The method comprises: sensing a temperature of the brake system of the vehicle; determining that the temperature of the brake system is above a first predetermined temperature threshold; issuing a first warning in response to the temperature of the brake system exceeding the first predetermined temperature threshold; determining that the temperature of the brake system is above a second predetermined temperature, the second predetermined temperature being greater than the first predetermined temperature; issuing a second warning in response to the temperature of the brake system exceeding the second predetermined temperature threshold; reducing engine power output in response to the temperature of the brake system exceeding the second predetermined temperature threshold; determining that the temperature of the brake system is above a third predetermined temperature threshold; issuing a third warning in response to the temperature of the brake system exceeding the third predetermined temperature threshold; and causing the engine to shut down and cease powering an endless track of the snowmobile.

Another embodiment of the disclosure is a warning and control system for a snowmobile. The system includes: a brake-system temperature sensor configured to sense a temperature of a brake system; a digital memory storage device storing first, second and third temperature threshold data; and an engine control module (ECM) in electrical communication with the brake-system temperature sensor and the digital memory storage device, the ECM including a processor. The ECM is configured to compare a first data signal received from the brake-system temperature sensor to the first temperature threshold data and output a first warning command, is configured to compare a second data signal received from the brake-system temperature sensor to the second temperature threshold data and output a first engine control command based on the comparison of the received second data signal and the second temperature threshold data, and is configured to compare a third data signal received from the brake-system temperature sensor to the third temperature threshold data and output a third engine control command based on the comparison of the received third data signal and the third temperature threshold data.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The disclosure can be understood in consideration of the following detailed description of various embodiments in connection with the accompanying drawings, in which:

FIG. 9 is a flowchart describing a brake-temperature sensing, warning and vehicle control method, according to an embodiment of the disclosure;

FIG. 10 is a flowchart describing another brake-temperature sensing, warning and vehicle control method, according to an embodiment of the disclosure.

DETAILED DESCRIPTION

Figure 1:
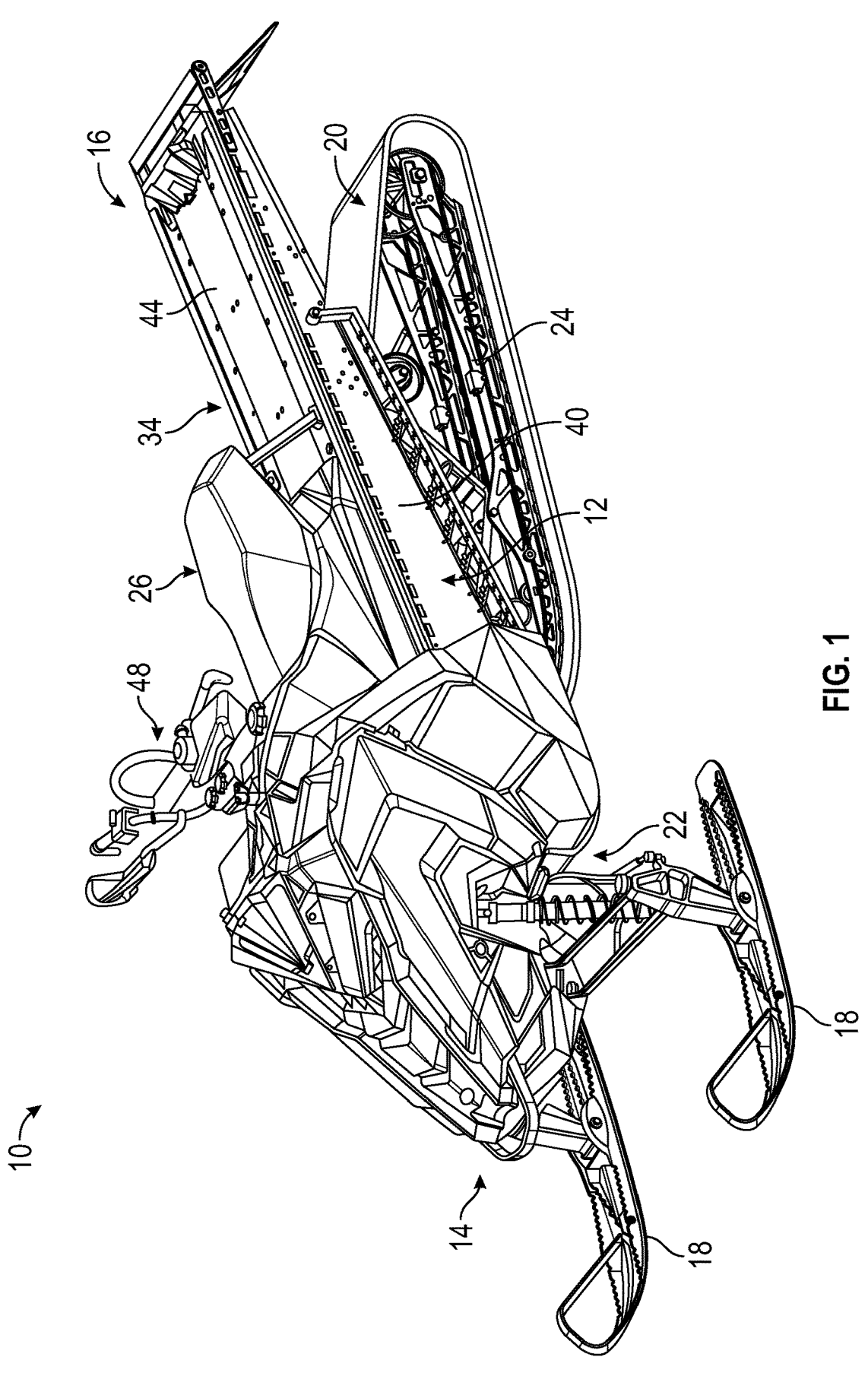
FIG. 1 is a perspective view of a snowmobile, according to an embodiment of the disclosure.

For the purposes of understanding the disclosure, reference will now be made to the embodiments illustrated in the drawings, which are described below. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all combinations, modifications, equivalents, and alternatives falling within the spirit and scope of the invention as defined by the appended claims.

While the present disclosure primarily involves a snowmobile, it should be understood, however, that the invention may have application to other types of vehicles, such as other snow vehicles, motorcycles. ATVs, utility vehicles, and various off-road vehicles.

Figure 2:
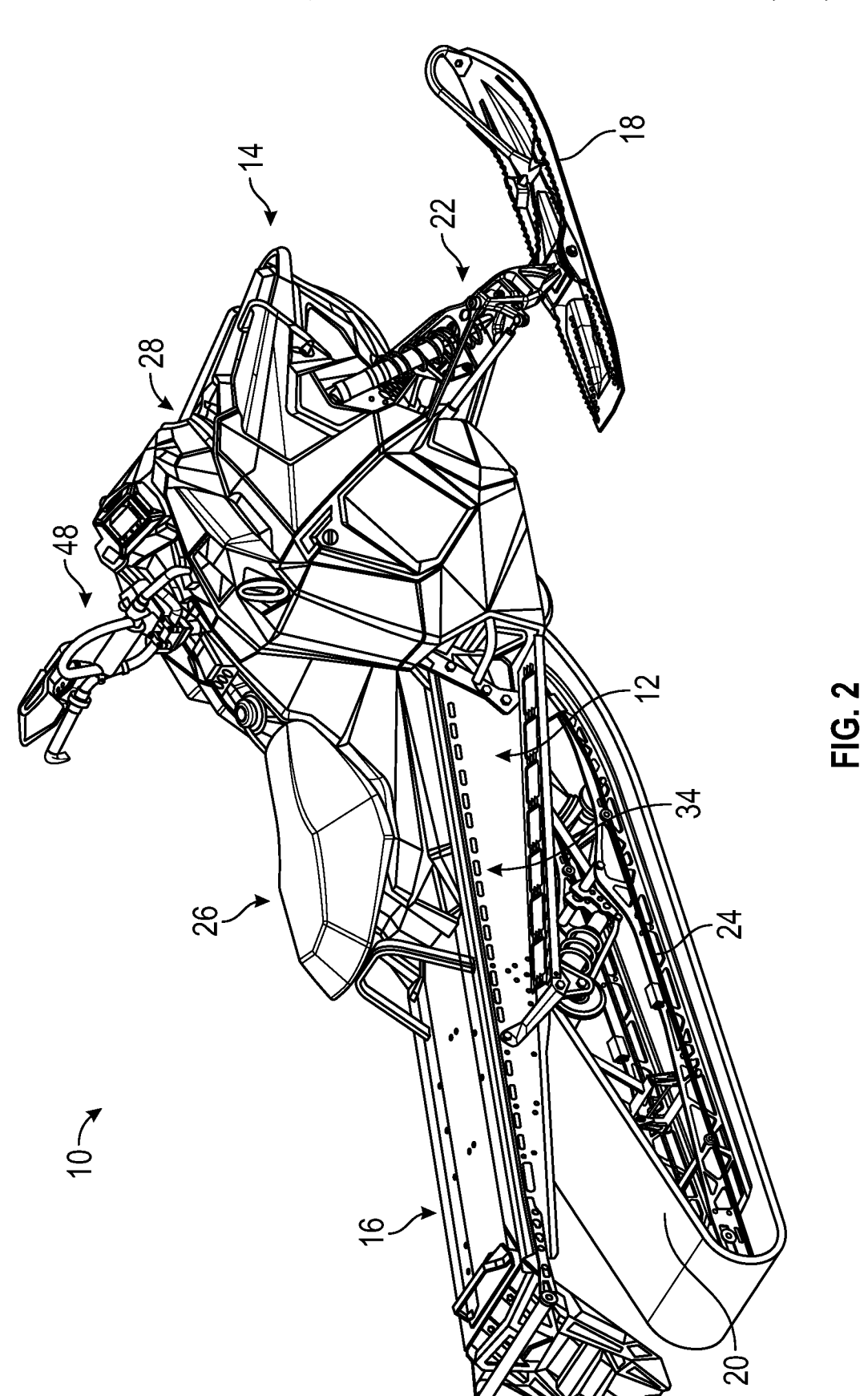
FIG. 2 is another perspective view of the snowmobile of FIG. 1, according to an embodiment of the disclosure
Figure 3:
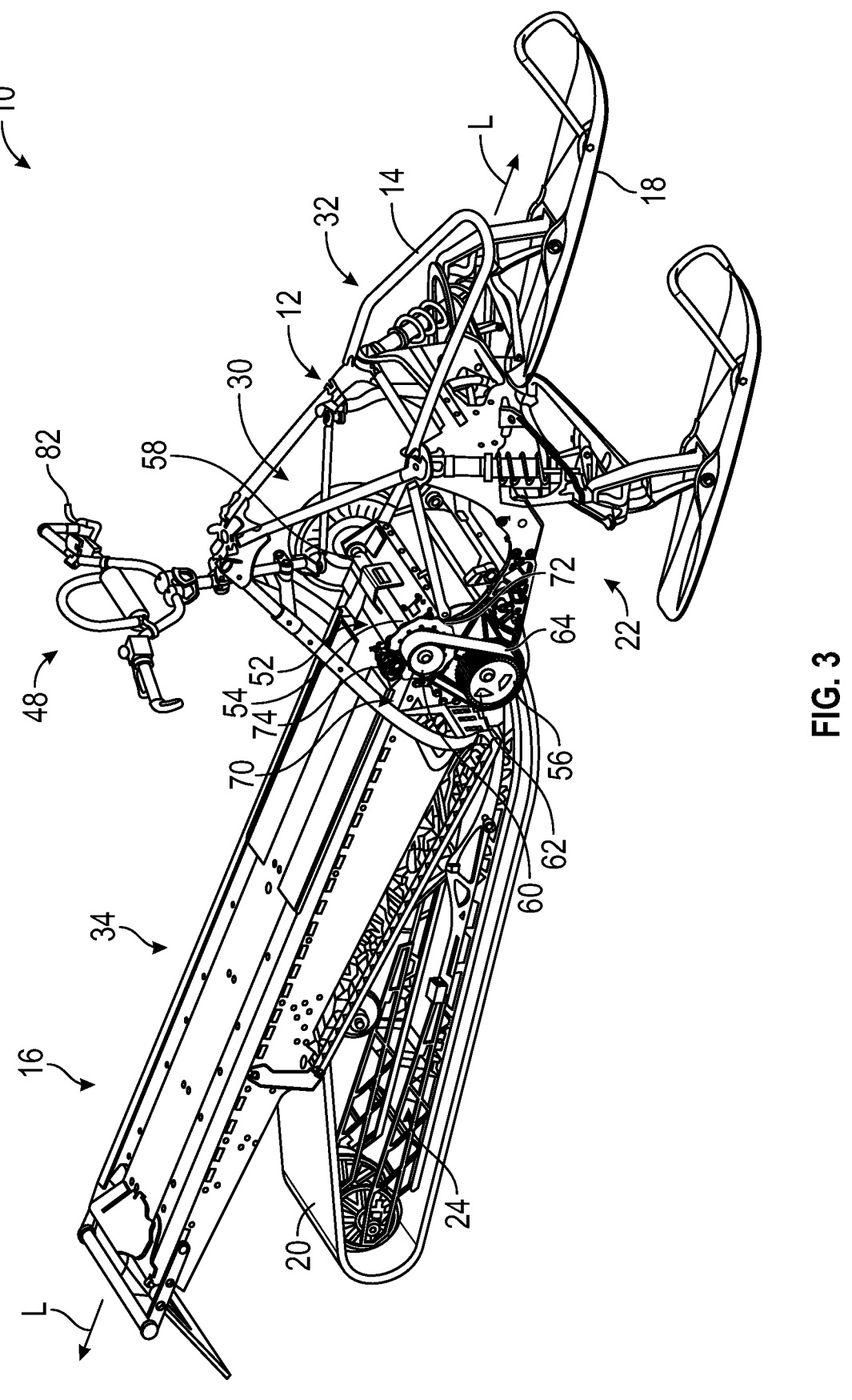
FIG. 3 is a perspective view of the snowmobile of FIGS. 1 and 2, with body panels removed.

Referring to FIGS. 1-3, an embodiment of snowmobile 10 includes chassis or frame assembly 12 having front frame portion 14 and rear frame portion 16. Front frame portion 14 is supported by skis 18, and rear frame portion 16 is supported by endless track 20. Front skis 18 are operably coupled to front suspension assembly 22, and endless track 20 cooperates with rear suspension assembly 24 during operation of snowmobile 10. Snowmobile 10 also includes seat assembly 26 having a seating portion for at least a driver and an optional seating portion for a passenger positioned rearward of the driver portion.

Snowmobile 10 further includes body assembly 28 comprised of multiple body panels covering certain components and systems of snowmobile 10, including portions of frame assembly 12, front suspension assembly 22, and powertrain assembly 30.

Referring specifically to FIG. 3, frame assembly 12 includes a bulkhead 32 coupled to a tunnel 34 extending along a longitudinal axis L of snowmobile 10. Bulkhead 32 supports a steering assembly 48.

Powertrain assembly 30 provides power to endless track 20 to move snowmobile 10. Powertrain assembly 30 is supported by front frame portion 14 and includes an engine 50 and a transmission (not shown).

As will be understood by those of skill in the art, engine 50 includes various systems and components, such as an engine block with a combustion chamber, pistons, intake and exhaust valves, a fuel system, which may be an electronic fuel-injection (EFI) system, an electrical system, a cooling system, an exhaust system, and various sensors, such as a throttle position sensor, crank position sensor, and so on. Various embodiments of snowmobiles, snowmobile engines, systems and so on are known in the art and are described in U.S. Pat. No. 8,590,654, issued Nov. 26, 2013 and entitled "Snowmobile," in U.S. Pat. No. 8,733,773, issued May 27, 2014 and entitled "Snowmobile Having Improved Clearance for Deep Snow," in U.S. Patent Pub. No. 2014/0332293A1, published Jul. 23, 2014 and entitled "Snowmobile," and in U.S. Pat. No. 11,110,994, issued Sep. 7, 2021 and entitled "Snowmobile," all of which are assigned to Polaris Industries Inc., and all of which are incorporated herein by reference in their entireties.

Powertrain assembly 30 also includes a drivetrain assembly 52 comprising a countershaft or jackshaft 54 and a track driveshaft 56. Jackshaft 54 is operably coupled with the transmission and, in embodiments using a continuously variable transmission ("CVT"), is operably coupled with the secondary or driven pulley. Jackshaft 54 also is operably coupled to driveshaft 56 through a belt/chain drive assembly 58. Belt/chain drive assembly 58 includes a drive sprocket 60, a driven sprocket 62, and a belt or chain 64 rotatably entrained with drive and driven sprockets 60, 62. Driven sprocket 62 is coupled with driveshaft 56. In operation, the crankshaft (not shown) of engine 50 drives the transmission, thereby causing the transmission to output power (e.g., rotation) to jackshaft 54. Jackshaft 54 then drives driveshaft 56 through belt/chain drive assembly 58. As a result, driveshaft 56 rotates within a portion of tunnel 34.

Driveshaft 56 engages an inner surface of track 20, such that as jackshaft 54 drives driveshaft 56, through belt/chain drive assembly 58, driveshaft 56 causes track 20 to rotate and move snowmobile 10.

Snowmobile 10 also includes brake system 70, which may be a dry or wet brake system. In an embodiment, brake system 70 is a hydraulic disc-brake system, and 70 is coupled to the transmission. Brake system 70 may be directly coupled to jackshaft 54, or to other portions of the transmission.

Figure 4:
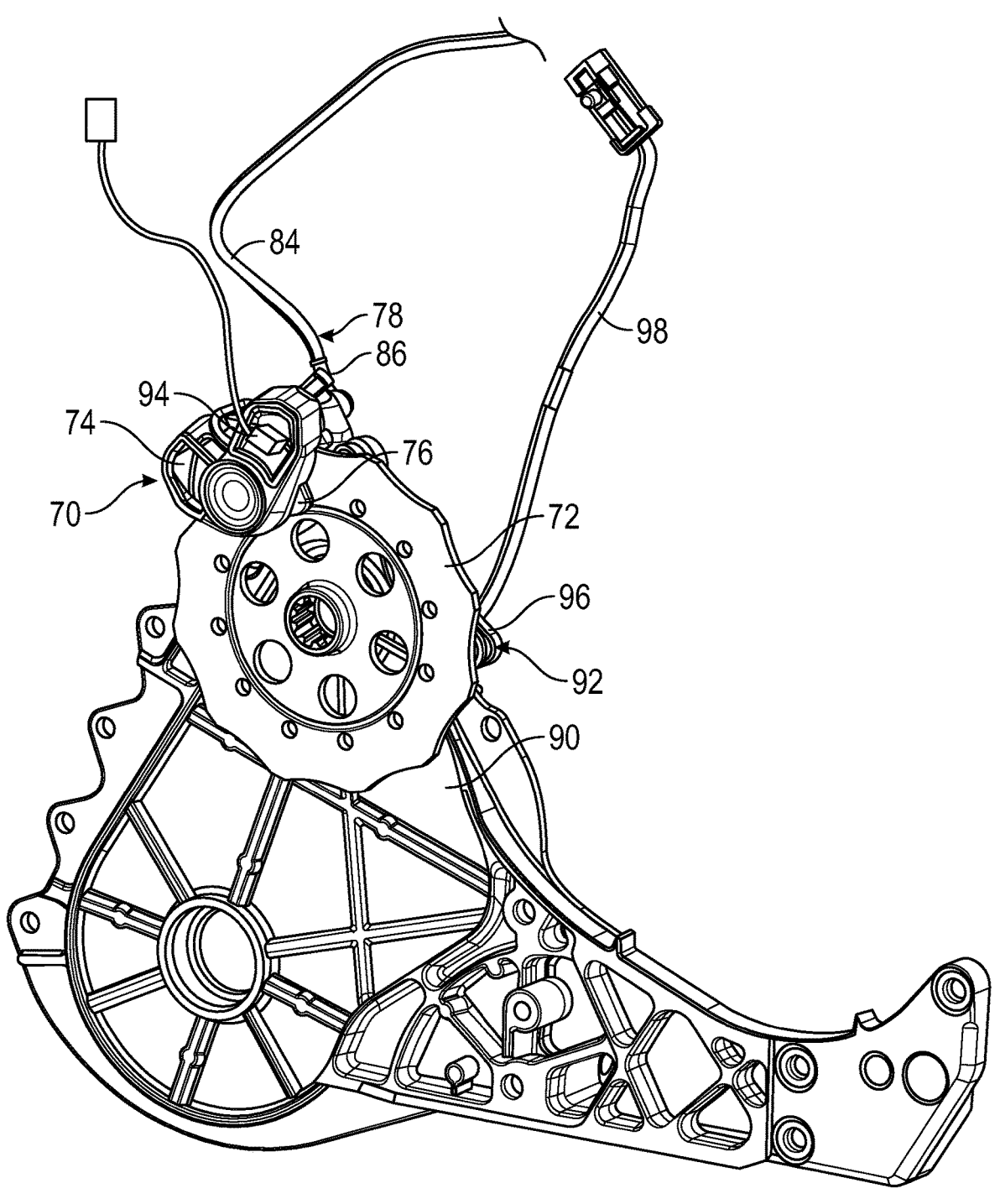
FIG. 4 is a left-side perspective view of a brake system with temperature monitoring, according to an embodiment of the disclosure.
Figure 5:
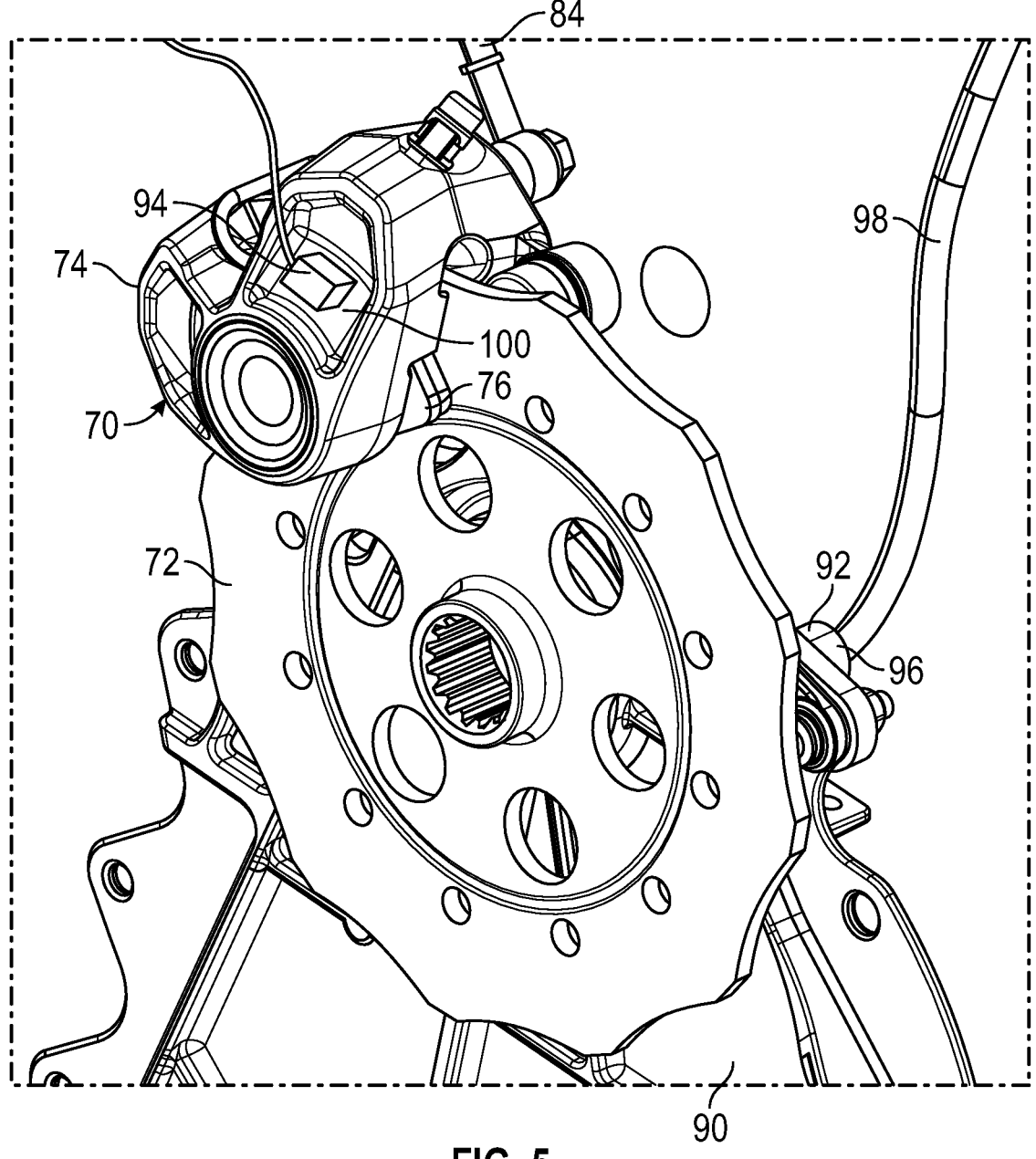
FIG. 5 is a close-up view of the brake system with temperature monitoring of FIG. 4.

Referring also to FIGS. 4-5, brake system 70, in an embodiment, includes brake rotor 72, brake caliper 74, brake pads 76, brake-fluid system 78, coupler 80, user brake actuator or lever 82 (FIG. 3), and in some cases, a brake actuator switch (not depicted). Brake-fluid system 78 includes fluid hose 84, connector 86, which in an embodiment is a banjo bolt, as well as hydraulic brake fluid and a fluid reservoir (not depicted).

As depicted in this embodiment, brake rotor 72 is connected to coupler 80; coupler 80 is connected to jackshaft 54. While snowmobile 10 is in motion, and jackshaft 54 is rotating, brake rotor 72 and coupler 80 will also rotate with jackshaft 54. Brake caliper 74 supports brake pads 76, which are adjacent to brake rotor 72, with one brake pad on each side of brake rotor 72. Fluid hose 84 is connected to brake caliper 74 via connector 86 at a first end, and to operator brake actuator 82 at a second end, such that brake caliper 74 and brake lever 86 are in fluid communication via brake-fluid system 78.

In operation, when an operator actuates brake actuator 82, such as by squeezing a lever 82, one or more brake pistons of caliper 74 move brake pads 76 toward each other thereby contacting and squeezing or clamping brake rotor 72. The friction between brake pads 76 and brake rotor 72 decreases rotation of brake rotor 72 and of connected jackshaft 54. This counterforce applied to the transmission slows or stops snowmobile 10.

Various hydraulic disc braking systems are known in the art, such as U.S. Patent Pub. No. 20211/0214044A1, published Jan. 8, 2021, entitled "Braking Assembly for a Snowmobile" and assigned to Polaris Industries Inc., which is incorporated herein by reference in its entirety.

Referring specifically to FIGS. 4-5, brake system 70 is depicted with an engine case or casting, such as engine chain case 90 depicted, speed sensor system 92 and brake-system temperature sensor 94.

Speed sensor system 92, in an embodiment, includes speed sensor 96 and speed-sensor wiring harness 98. In the embodiment depicted, speed sensor 96 is mounted to engine case portion 90 and senses rotation of brake rotor 72 or rotation of components connected to brake rotor 72. Signals or information relating to sensed rotation, which corresponds to a speed of snowmobile 10, is transmitted to an engine control module (ECM) of snowmobile 10, or another processor, via speed-sensor wiring harness 98 for processing.

Brake-system temperature sensor 94 may comprise one or more of various temperature-sensing devices, such as, but not limited to, a thermistor, a resistance temperature detector (RTD), a thermocouple, a semiconductor-based temperature sensor, and an infrared (IR) temperature sensor.

Referring specifically to FIG. 5, which depicts an enlarged portion of FIG. 4, brake-system temperature sensor 94 is mounted directly to an outside surface 100 of brake caliper 74, though as described further below, sensor 94 may be mounted in many other locations, or on other components, depending on which portion or component of the brake system 70 is to have its temperature sensed or monitored, and what type of sensor 94 is used.

Figure 6:
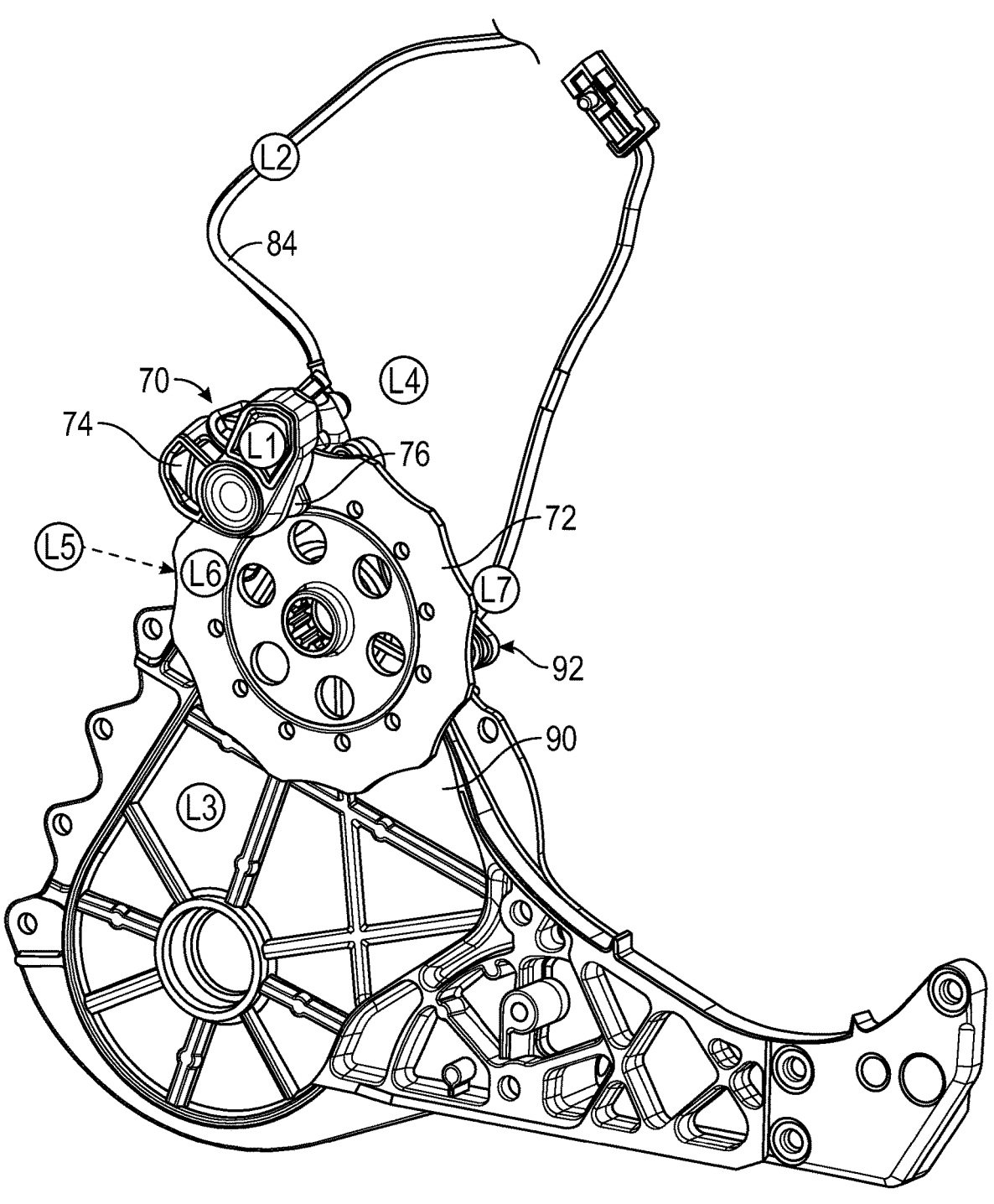
FIG. 6 is a perspective view of a brake system depicting various locations for temperature monitoring and sensing, according to an embodiment.

Referring also to FIG. 6, various locations "L" for brake-system temperature sensor 94 are depicted. In other words, in an embodiment, brake-system temperature sensor 94 may be located at, but not limited to, one or more of locations L1, L2, L3, L4, L5, L6 and L7, directly or indirectly measuring a temperature of brake system 70.

At location L1, brake-system temperature sensor 94 is mounted directly to brake caliper 74, and thusly directly measures a temperature of an outside surface 98 of brake caliper 74.

At location L2, brake-system temperature sensor 94 is mounted directly to a portion of fluid hose 84. In such an embodiment, the temperature of fluid hose 84 in combination with known dimensions and material properties of fluid hose 84 may be used to estimate a temperature of the brake fluid of brake system 70.

At location L3, a temperature of chain case 90 may be sensed and determined. In other embodiments, a temperature of other engine cases or castings that are in the vicinity of, or in some cases, coupled to, components of brake system 70.

At location L4, an ambient air temperature in a vicinity of brake system 70 is sensed. In an embodiment, a distance from location LA to one or more components of brake system 70 may be known.

At location L5, an ambient air temperature in the vicinity of brake system 70 may be sensed. However, in another embodiment, brake-system temperature sensor 94 may comprise an IR temperature sensor directed to location L6, such that a temperature at L6 is sensed or detected by brake-system temperature sensor 94. In an embodiment. L6 is at an outer surface of brake rotor 72, such that brake-system temperature sensor 94 detects a temperature of brake rotor 72.

At location L7, brake-system temperature sensor 94 is combined with speed sensor system 92. In an embodiment, brake-system temperature sensor 94 is integrated with speed sensor 96 to form a speed-and-temperature sensor that both senses speed and also senses temperature. The integration of brake-system temperature sensor 94, in an embodiment, may include co-locating brake-system temperature sensor 94 and speed sensor 96 in a common housing. In one such embodiment, wiring harness 98 may include wiring to transmit brake-system temperature signals or data.

The combination sensor may be mounted in the same location, L7, as a speed sensor 96 would typically be mounted, which is near rotor 72. In other embodiments, temperature sensor 96 is not integrated with, or housed together with, speed sensor 96, but may be coupled to speed sensor system 92, such as at a mounting component of speed sensor system 92.

In other embodiments, other locations for sensing temperatures of various components of brake system 70 and/or ambient air temperatures around components of brake system 70 are contemplated.

As described further below, the sensed temperature of brake system 70 can be used to determine whether brake system 70 is being subjected to temperatures that may result in diminishing braking function or even brake failure, resulting in the need for corrective action. As is evident from the description above, sensing the temperature of brake system 70 may include directly sensing a temperature of a component of the brake system 70, such as brake rotor 72, caliper 74, fluid hose 84, brake fluid, and so on, sensing a temperature of a component in contact with, or coupled to, a portion of the brake system 70, such as engine chain case 90, or sensing an ambient temperature in the vicinity of one or more components of brake system 70.

Embodiments of temperature sensors and methods of monitoring and sensing brake temperatures on various vehicles are described in PCT International Patent Publication No. WO 84/00406, published Feb. 2, 1984, and entitled "Heat Sensors for Overheating Brakes and Wheels," in U.S. Pat. No. 5,637,794, issued Dec. 22, 1995, and entitled "Resistive Brake Lining Wear and Temperature Sensing System," in PCT International Patent Publication No. WO 92/00212, published Jan. 9, 1992, and entitled "Vehicle with Brake Temperature Monitoring", in U.S. Pat. No. 7,523,811, issued Apr. 28, 2009, entitled "Method and System for Measuring the Wear of a Ceramic Disk of a Disk-Brake Disk," and in U.S. Pat. No. 8,437,934, issued May 7, 2013, entitled "Temperature and Wear and Tear Sensor for Brake or Clutch Devices." all of which are incorporated by reference in their entireties herein.

Figure 7:
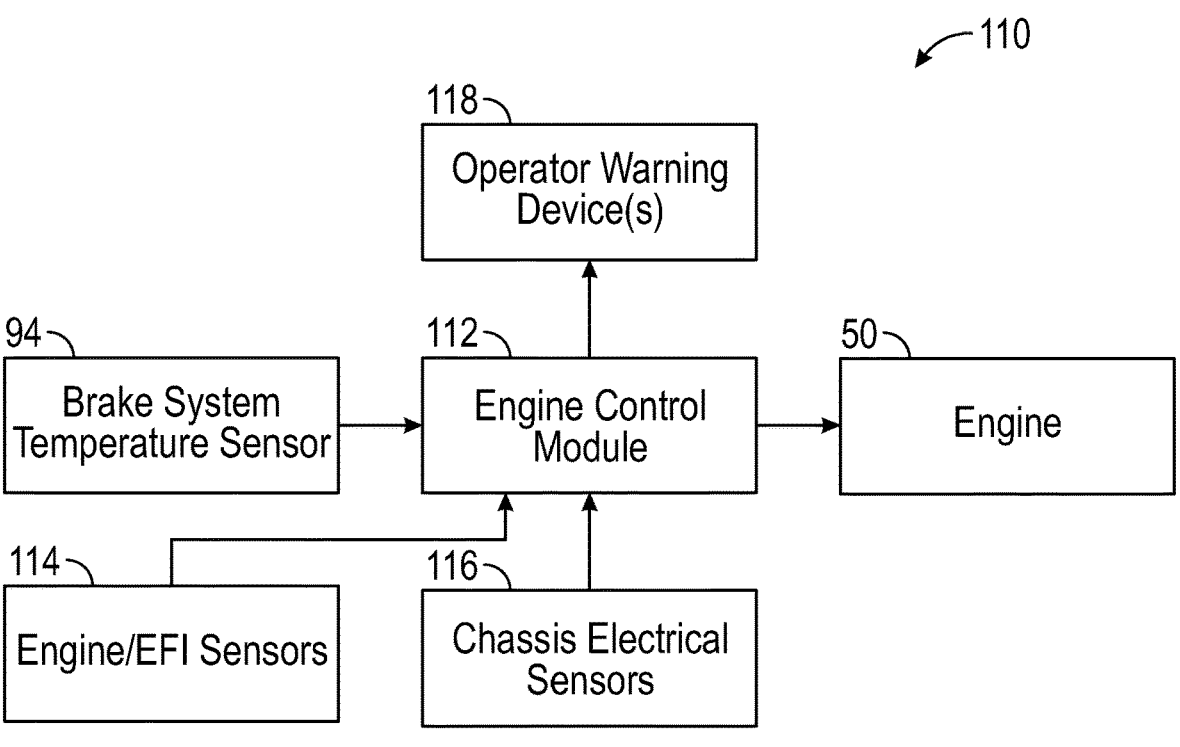
FIG. 7 is a block diagram of a snowmobile brake system with temperature monitoring and sensing, according to an embodiment of the disclosure.

Referring to FIG. 7, a block diagram of a brake-system temperature sensing, control and warning system 110 is depicted. In an embodiment, and as depicted, brake-system temperature sensing, control and warning system 110 includes engine control module (ECM) 112, engine/EFI sensors 114, chassis electrical sensors 116, chassis electrical sensors 116, brake-system temperature sensor 94, and engine 50.

ECM 112, which in the art may also be known as an "engine control unit" or ECU, is in electrical communication with the sensors, systems and components of system 110, including sensors 94, 114, 116, 118, engine 50, user and warning devices 118. Communication may be via a CAN bus. In an embodiment, ECM 112 may include one or more processors or microcontrollers, memory devices, and other hardware and software components.

Sensors 114 may include sensors that monitor or sense data relating to engine 50, and in particular, an EFI system that controls fuel to engine 50. In an embodiment, sensors 114 may include a throttle sensor for sensing an amount of fuel being delivered to engine 50. Data or information from sensors 114 is communicated to ECM 112.

Chassis electrical sensors 116 may include various sensors relating to, or connected to, the chassis or frame assembly 12. Such sensors 116 may include a brake sensor that senses when an operator actuates brake system 70. In one such embodiment, a brake sensor may comprise a switch located at or near brake lever 86 and that detects when brake lever 86 is actuated. Data or information relating to chassis electrical sensors 116 is communicated to ECM 112.

Brake-system temperature sensor 94, as described above, is also in electrical communication with ECM 112, such that data or information from or relating to brake-system temperature sensor 94 is communicated to ECM 112.

Various operator warning devices 118 are also in communication with ECM 112. As will be explained further below, operator warning devices 118 function to provide visual, audible, and/or tactile warnings to an operator of snowmobile regarding various conditions, including a condition of a current or potential overheating of brake system 70.

Operator warning devices 118 may include one or more known warning devices, including a display device, warning lights, audible alarm, vibrator, and so on. An operator warning device 118 that is a display device may take the form of a primary vehicle display device that includes a graphical user interface (GUI). In one such embodiment, the GUI of the display device may visually communicate warnings to an operator via display of textual warning messages, display of lights indicating a status, such as one or more of a green, yellow or red light corresponding to various conditions, display of icons, such as a brake temperature icon, display of system or component temperatures, such as a brake system 70 temperature, and so on.

ECM 112 is generally configured to control the various systems and operations of snowmobile 10 based on data provided by the sensors of system 110, as well as other snowmobile 10 sensors and systems, as will be understood by those of ordinary skill in the art. Such control also includes control of engine 50 and its various components and systems, including an EH system.

As will also be explained in further detail below, in embodiments, ECM 112 is configured to receive information from brake-system temperature sensor 94, engine/ER sensors 114 and chassis electrical sensors 116, process the received information, then provide warnings to an operator via operator warning devices 118, and in some embodiments, also modify engine 50 settings or operations in response to the received information from the sensors. For example, in an embodiment, ECM 112 may receive temperature data from brake-system temperature sensor 94, from a throttle sensor 114 and a brake sensor 116, then output a high-brake-temperature warning to the operator via a display device 118, and subsequently reduce or limit power to engine 50. Such an embodiment reduces potential hazardous situations for the operator and reduces possible engine damage or wear.

Figure 8:
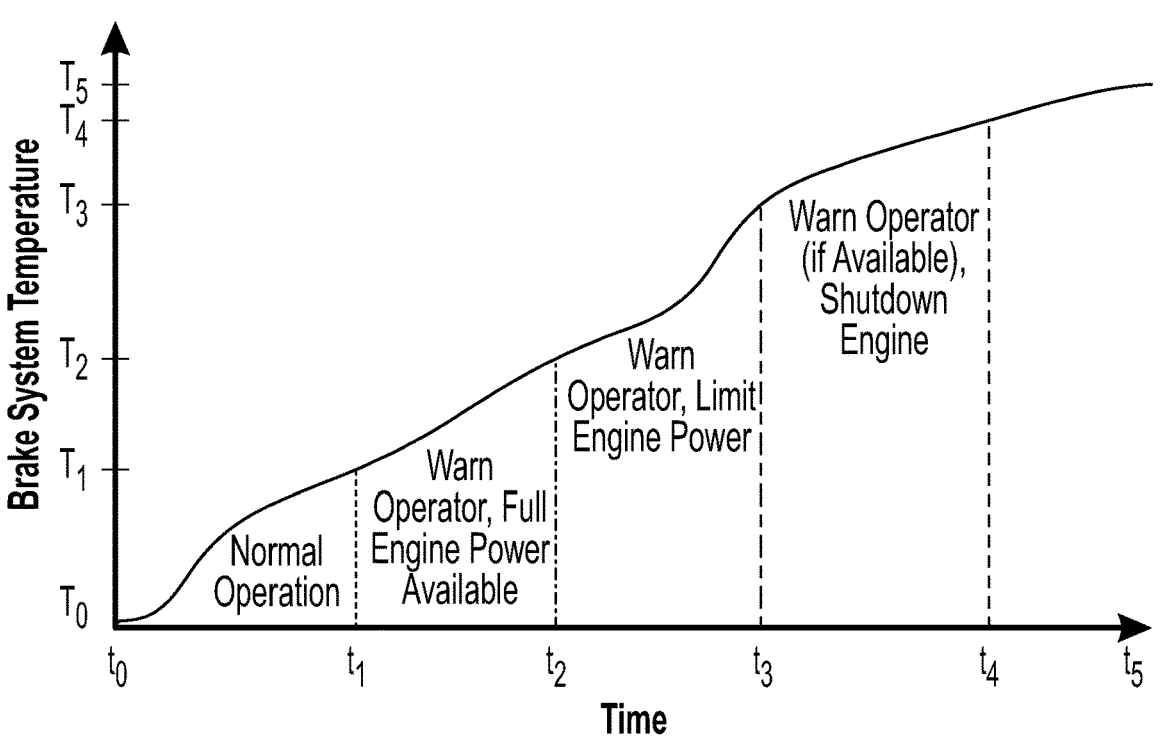
FIG. 8 is a graph of brake-system temperature vs. time, according to an embodiment of the disclosure.

Referring to FIG. 8, a graph of brake system temperature vs. time is depicted. In this illustration, brake system temperature T ranges from $T_0$ to $T_5$, and time ranges from $t_0$ to $t_5$. Temperatures $T_1$, $T_2$, $T_3$ and $T_4$ are threshold temperatures occurring at times $t_1$, $t_2$, $t_3$ and $t_4$, respectively. As depicted, the graph of FIG. 8 depicts five specific temperature ranges ($T_0$ to $T_1$, $T_1$ to $T_2$, $T_2$ to $T_3$, $T_3$ to $T_4$ and $T_4$ to $T_5$) and corresponding time periods ($t_0$ to $t_1$ through $t_4$ to $t_5$), and four conditions or stages of vehicle operation, including "normal operation", "warn operator, full engine power available," "warn operator, limit engine power," and "warn operator, shut down engine." However, it will be understood that more or fewer temperature ranges and operating modes may be defined, as is described further below with respect to FIGS. 9-11.

As described briefly above, brake system temperature T may be a temperature of one or more components of brake system 70, e.g., brake rotor 72 or brake pad 76, may be an ambient air temperature in the vicinity of one or more components of brake system 70, such as at location L4 (see FIG. 6), or may be a calculated temperature of one or more directly- or indirectly-measured temperatures. Threshold temperatures $T_1$, $T_2$, $T_3$ and $T_4$ may vary depending on a particular snowmobile 10 design, including brake system 70 component size, location and function. In an embodiment, threshold temperature $T_1$ may be a predetermined temperature in a range of 30° F. to 400° F., e.g., 350° F.; threshold temperature $T_2$ may be a predetermined temperature in a range of 400° F. to 600° F., e.g., 500° F.; threshold temperature $T_3$ may be a predetermined temperature in a range of 600° F. to 900° F., e.g., 700° F.; and threshold temperature $T_4$ may be a predetermined temperature in a range of 900° F. to 1,000° F., e.g., 950° F.

Referring also to FIG. 7, and more generally, when brake system temperature T is communicated to ECM 112, and brake system temperature T is determined by ECM 112 to be in a particular range, ECM 112 may cause a warning commensurate with temperature T to be issued via operator warning device 112. Depending on the temperature T relative to the threshold temperatures, ECM 112 may also communicate to engine 50 to change an operation, such as reducing engine power or shutting down engine 50.

As indicated in FIG. 8, when brake system temperature T is less than first threshold temperature $T_1$, snowmobile 10 and engine 50 are determined to be normally operating. In other words, first threshold temperature $T_1$ corresponds to a maximum normal operating temperature of brake system 70. Under this normal-operating condition, or "normal operation" condition or stage, ECM 112 does not cause a warning to be directed to the operator, and does not intervene with normal operation of engine 50.

When brake system temperature T is greater than first threshold $T_1$, but less than second threshold $T_2$, ECM 112 determines that temperature T of brake system 70 has exceeded a typical operating temperature. In an embodiment, ECM 112 causes one or more operator warning devices 118 to output a warning to the operator of snowmobile 10. The warning may be an indication that the brake-system temperature T has exceeded a normal operating temperature. In an embodiment, ECM 112 does not intervene with normal operation of snowmobile 10, and full engine 50 power is available to the operator in this second condition or stage labeled "warn operator, full engine power available". As described above, a warning may take one or more of various forms, such as a visual text, icon, or data message on a display, an alarm noise or voice warning, turning on of one or more lights, such as an LED, flashing of lights, changing a display color, and so on. In an embodiment, a textual warning may take many forms. In an embodiment a textual warning may include a description of the brake temperature situation, e.g., "High Brake System Temperature" or similar. In another embodiment, a textual warning may include a command or suggestion directed to the operator, such as "Release Brakes Now," or similar.

With respect to timing of outputting a warning, in an embodiment, a warning may be output issued immediately upon brake-system temperature T meeting or exceeding first threshold temperature $T_2$. In another embodiment, ECM 112 will delay causing a warning to be issued to an operator until brake-system temperature T has been at or above first threshold temperature $T_1$ for a predetermined period of time. In an embodiment the predetermined period of time is in a range of 10 seconds to 5 minutes; in another embodiment, the predetermined period of time is in a range of 10 seconds to 90 seconds; in yet another embodiment, the predetermined period of time is in a range of 1 minute to 3 minutes. It will be understood that the predetermined period of time may be determined by many factors, including the variability of brake-system temperature T, snowmobile speed (as provided by speed sensor 96), snowmobile engine rpm, number of occurrences of brake-system temperature T exceeding threshold $T_1$ in another predetermined period of time, physical design parameters of components of brake system 70, and so on.

In a third stage, "warn operator, limit engine power," when brake system temperature T reaches or exceeds second threshold $T_2$, as determined by ECM 112, ECM 112 causes one or more operator warning devices 118 to output a warning to the operator of snowmobile 10. In an embodiment, the warning or warnings may be the same as, and in some embodiments, continuous with, those warnings previously provided to the operator when the brake-system temperature T exceeded first threshold temperature $T_1$. In another embodiment, the warning after exceeding temperature threshold $T_2$ may be changed, or escalated to indicate an even higher brake-system temperature or to indicate that the operator should take additional action, thereby indicating a more serious operating condition that may be alleviated by the operator modifying his/her operation of snowmobile 10. For example, a warning may comprise an indication for the operator to stop actuating brake lever 86 and/or to reduce throttle input.

In an embodiment, when brake-system temperature T meets or exceeds second temperature threshold $T_2$, ECM 112 may intervene with normal operation of snowmobile 10, which may include overriding operator inputs. In one such embodiment, ECM 112 reduces or limits engine power output, or enters a first power-limited operating mode $M_1$. For example, in first power-limited operating mode $M_1$, ECM 112 may reduce available fuel input to engine 50 via the EFI, or may change or limit an engine valve position, such as maintaining an exhaust valve in a low position to limit exhaust output and reduce effective engine power. A reduction in engine power may reduce brake system temperature T depending on the operating status of snowmobile 10, including whether brake system 70 is actuated, i.e., the operator is applying the brakes. If the operator is actuating brake system 70 while operating the throttle to maintain or increase engine power output, temperature T of brake system 70 may increase, such as increasing above the various thresholds $T_1$ to $T_4$. An intervention of ECM 112 to reduce engine power output, which may be in contradiction to the operator inputs, the energy required to brake and slow snowmobile 10 is reduced, which may reduce brake system temperature T below second threshold $T_2$ and ideally first temperature threshold $T_1$. Further a reduction in engine output may reduce snowmobile 10 speed, which may be favorable if braking function is reduced due to high brake-system temperatures T.

With respect to timing of issuing warnings, in an embodiment, warnings may be issued immediately upon brake-system temperature T meeting or exceeding second threshold temperature $T_2$, or after a predetermined period of time, as described above with respect to brake system temperatures T exceeding the first temperature threshold $T_1$.

With respect to timing of implementing first power-limited operating mode $M_1$, ECM 112 may implement such a power-limiting mode immediately upon brake-system temperature T meeting or exceeding threshold temperature $T_2$, or may be implemented after a predetermined period of time. Similar to the predetermined period of time to wait before issuing a warning, in an embodiment, ECM 112 will delay implementing a power-reduction mode, such as mode $M_1$, until brake-system temperature T has been at or above first threshold temperature $T_1$ for a predetermined period of time. In an embodiment the predetermined period of time is in a range of 10 seconds to 5 minutes; in another embodiment, the predetermined period of time is in a range of 10 seconds to 90 seconds; in yet another embodiment, the predetermined period of time is in a range of 1 minute to 3 minutes. It will be understood that the predetermined period of time may be determined by many factors, including the variability of brake-system temperature T, snowmobile speed, number of occurrences of brake-system temperature T exceeding threshold $T_1$ in another predetermined period of time, physical design parameters of components of brake system 70, and so on.

As described above, in first power-limited operating mode $M_1$, ECM 112 limits or reduces engine power. In an embodiment, ECM 112 restricts exhaust valve operation to limit or reduce power. In another embodiment, in first power-limited operating mode $M_1$, ECM 112 limits engine power to a specific maximum output. The limited maximum output may correspond to a specific quantity, or a predefined percentage, of fuel or air/fuel mixture that may be input to engine 50. For example, maximum output may be limited to 50% of normal maximum output. In another embodiment, engine 50 power may be limited by proportionately reducing, an amount of power called for by a user input, i.e., reducing desired power by a scaling factor. For example, if the operator actuates a throttle which would normally result in 50% of maximum power output of engine 50, ECM 112 in first power-limited operating mode $M_1$ might reduce output power by half, or 25% of the maximum power output.

In an embodiment, when brake-system temperature T meets or exceeds third temperature threshold $T_3$, i.e., is in condition or stage "warn operator, shut down engine," ECM 112 may warn the operator of the high brake system temperature, and may implement a second power-limited mode $M_2$, which may result in shutting down engine 50.

In an embodiment, ECM 112 may output warnings indicating an even higher brake system temperature, or warnings indicating an increased importance to reduce brake-system temperature T, including reducing power output. In other embodiments, ECM 112 may output the same warning as when brake-system temperature T was less than $T_3$. The timing of warnings may be similar to those described above, with ECM 112 causing warnings to be conveyed to the operator immediately upon surpassing third temperature threshold $T_3$, or after a predetermined time delay.

Second power-limited mode M2 may take various forms, which may include shutting down operation of engine 50 when brake system temperature T is equal to, or exceeds, third threshold temperature T3, when brake system temperature T surpasses third threshold temperature $T_3$ and begins to approach fourth temperature threshold $T_4$, or when brake system temperature T meets or exceeds fourth temperature threshold $T_4$. Shutting down engine 50 may be accomplished by various methods, including ceasing ignition operation, closing of engine 50 valves, fuel cut-off, and so on.

In an embodiment, when brake-system temperature T is reduced, ECM 112 may stop implementing first and/or second power-limiting modes $M_1$ and $M_2$.

Referring to both FIGS. 7 and 8, in embodiments, ECM 112 may determine whether to implement or cease first and/or second power-limiting modes $M_1$ and $M_2$ based not only on brake-system temperature T data received from brake-system temperature sensor 94, but also from one or more of engine/EFI sensors 114 and chassis electrical sensors 116. In an embodiment, ECM 112 may receive data from sensors 114, such from a throttle sensor and/or chassis electrical sensors 116, such as a brake actuation sensor or switch, as described above, and may process this data or information along with brake-system temperature data to determine whether and when to implement or cease first and/or second power-limiting modes $M_1$ and $M_2$.

In one such embodiment, ECM 112 receives data from a throttle sensor 114 indicating a throttle position. Based upon the received throttle position data in addition to the received brake-system temperature, ECM 112 may reduce or extend the predetermined period of time before implementing first and/or second power-limiting modes $M_1$ and $M_2$. In one such embodiment, ECM 112 receives data indicating that a throttle position is in a closed position, in addition to brake-system temperature T being above first threshold temperature $T_1$. In an embodiment, ECM 112 does not implement first power-limiting mode $M_1$, or increase a predetermined period of time for implementing first power-limiting modes $M_1$ and $M_2$ since the operator has already implemented a power-reduction action.

Similarly, in an embodiment, ECM 112 receives data from a brake-actuation sensor 116 indicating that brake system 70 is not being actuated. In such an embodiment, ECM 112 may reduce or extend the predetermined period of time before implementing first and/or second power-limiting modes $M_1$ and $M_2$ since a non-actuation condition of the brakes may reduce brake-system temperature T.

As described above, brake-system temperature sensing, control and warning system 110 may execute a variety of steps to sense brake-system temperature, warn an operator of the brake-system temperature, then take steps to control systems and components of snowmobile 10, including controlling power output of engine 50. Consequently, embodiments of the disclosure also include methods of sensing brake-system temperature, warning the snowmobile operator, and autonomously controlling snowmobile 10 systems.

Referring to the flowchart of FIG. 9, an embodiment of a brake-temperature sensing, warning and vehicle control method 120 is disclosed. In an embodiment, method 120 comprises steps 122 to 132 as described below.

At step 122, a brake system 70 temperature T is monitored or sensed. Monitoring or sensing of brake system 70 temperature T is described above with respect to FIGS. 3-8.

At step 124, if the sensed brake-system temperature T is not above a predetermined threshold temperature $T_1$, then monitoring and sensing of brake-system temperature T is continued at step 122. If the sensed brake-system temperature T is above a predetermined threshold temperature $T_1$, then at step 126, a brake-system temperature warning is issued or output to the operator of snowmobile 10.

Further with respect to step 124, ECM 112 receives temperature data, such as brake-system temperature T, from temperature sensor 94, and a processor compares it to threshold temperature $T_1$, which may be stored in a memory device of, or in communication with, ECM 112.

At step 126, a warning is generated and directed or issued to the operator of the snowmobile 10. The warning may be visual, audible, haptic, or a combination thereof, as described above with respect to FIGS. 3-8. In an embodiment, and as also described above, before a warning is generated, brake-system temperature T must stay above threshold temperature T1 for a predetermined period of time. Waiting for a predetermined period of time eliminates nuisance warnings that may be generated when brake-system temperature T only momentarily rises above threshold temperature $T_1$.

At step 128, a normal operation of engine 50 is modified in response to brake-system temperature T rising above threshold temperature $T_1$. In an embodiment, and as described above in more detail with respect to FIGS. 3-8, a "modification" of an engine 50 operation may comprise limiting engine 50 power or reducing engine 50 power through various means, including altering a position of one or more exhaust valves, or limiting a throttle actuation or fuel input.

At step 128, brake-system temperature T is again compared to the threshold temperature $T_1$, and if brake-system temperature T remains above threshold temperature $T_1$, then the engine modification may continue. In some embodiment, continuation of the engine modification may include further reducing or limiting engine 50 output power.

If at step 128, and after engine operation modification, brake-system temperature T has fallen to, or fallen below, threshold temperature $T_1$, then the engine operation modification is stopped or removed at step 132.

Referring to FIG. 10, another embodiment of a brake-temperature sensing, warning and vehicle control method, namely method 140 is disclosed. In an embodiment, method 140 comprises steps 142 to 154 as described below.

In this embodiment, steps 142, 144 and 146 are the same as steps 122, 124 and 126 of method 120 described above, i.e., sensing a brake-system temperature T, comparing to a threshold temperature $T_1$, and issuing a warning to an operator if the temperature T is above the threshold temperature $T_1$. However, unlike method 120, method 140 includes comparison to a second higher threshold temperature, and multiple restrictive engine modes, implemented as steps 148 to 154.

At step 148, and after issuing an initial warning to an operator at step 146, brake-system temperature T is compared to a second threshold temperature $T_2$. Second threshold temperature $T_2$ is greater than first threshold temperature $T_1$ If brake-system temperature T is below threshold temperature $T_2$, then no engine operation modification or engine power reduction is implemented by ECM 112, even if brake-system temperature T is above first threshold temperature $T_1$. Such an embodiment allows an operator to take corrective action, such as ceasing braking, slowing down, shutting off the engine, or similar. However, if the brake-system temperature T is above the second threshold temperature $T_2$, then another warning is issued to the operator, and a corrective action implemented by ECM 112 at step 150, immediately or after a predetermined delay.

At step 150, a second warning is issued to the operator, and engine 50 power is reduced or limited. The second warning may be the same as the initial/first warning, or may be a different warning indicating a more serious situation, such as a higher brake temperature, urging immediate response by the operator.

At step 152, brake-system temperature T is compared to second threshold temperature $T_2$, and if brake-system temperature T is still above second threshold temperature $T_2$, then another warning may be issued, or continued, and the reduction or limit on engine 50 power is maintained.

If at step 152, brake-system temperature T is below second threshold temperature $T_2$, then at step 154, the power limiting or power reduction mode or action ends, and normal engine operation is implanted by ECM 112.

Figure 11:
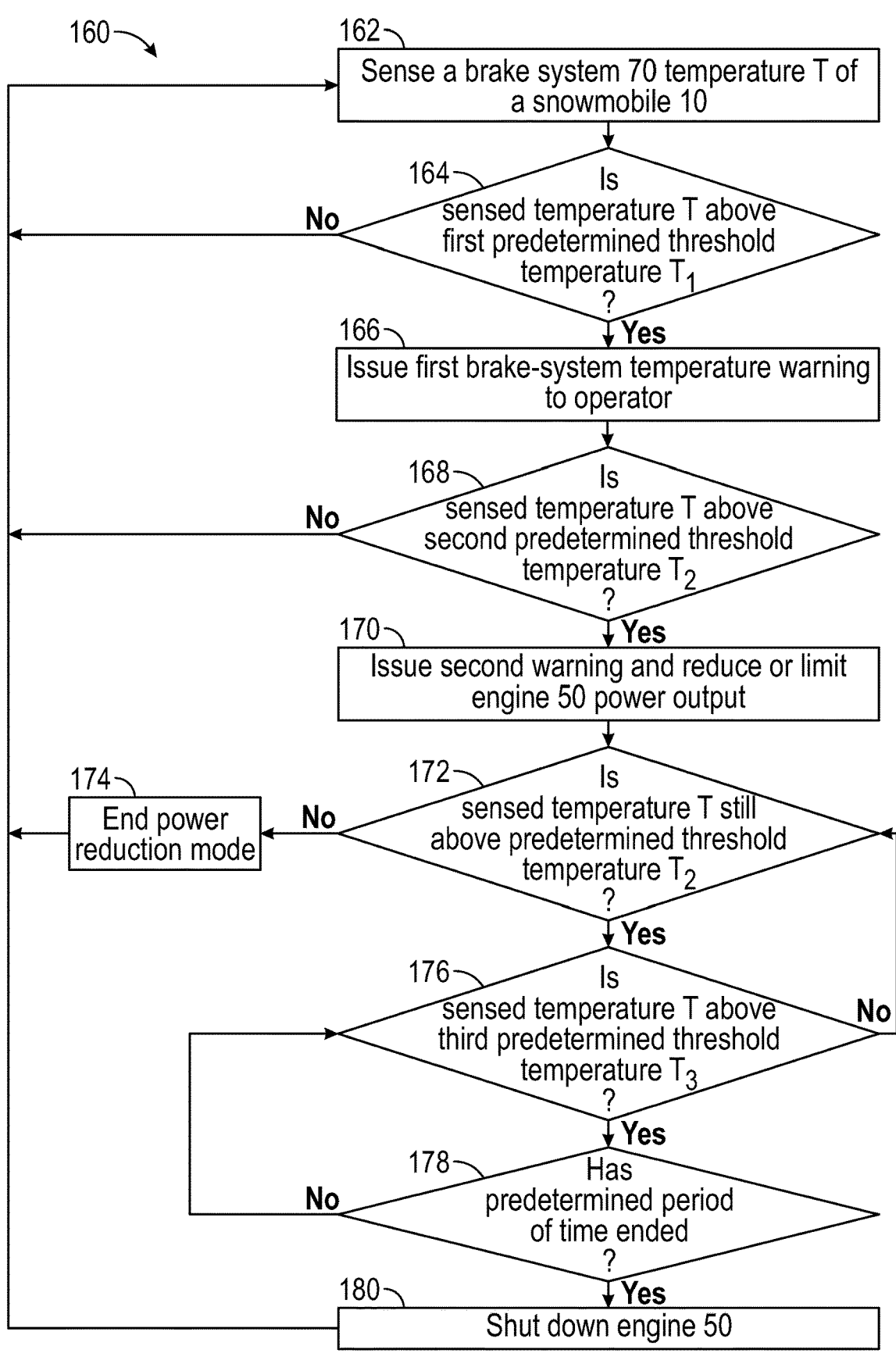
FIG. 11 is a flowchart describing yet another brake-temperature sensing, warning and vehicle control method, according to an embodiment of the disclosure.

Referring to FIG. 11, another embodiment of a brake-temperature sensing, warning and vehicle control method, namely method 160 is disclosed. Method 160 is very similar to method 140, but includes an additional temperature threshold T3, and an additional power reduction mode, namely, shutting off/down engine 50. In an embodiment, method 160 comprises steps 162 to 180 as described below.

In this embodiment, steps 162, 164, 166, 168, and 170 are the same as steps 142, 144, 146, 148 and 150 of method 140 described above.

At step 172, brake-system temperature T is compared to second temperature threshold $T_2$, and if brake-system temperature T is not above temperature threshold $T_2$, then the first power reduction mode ends, and the process returns to step 162. On the other hand, if brake-system temperature T is above temperature threshold $T_2$, then brake-system temperature T is compared to a higher threshold temperature at step 176.

At step 176, ECM 112 compares the sensed brake-system temperature T to the third temperature threshold $T_3$. Temperature threshold $T_3$ is greater than temperature threshold $T_2$. If brake-system temperature T is not above, or greater than third threshold temperature $T_3$, then the process returns to step 172, and sensed brake-system temperature T is again compared to second threshold temperature $T_2$. If brake-system temperature T is above third threshold temperature $T_3$, then in an embodiment, the process moves to step 178.

Step 178 is an optional step that requires that brake-system temperature T be maintained above third threshold temperature $T_3$ for a predetermined period of time before taking the step of shutting down engine 50 at step 180. In other embodiments, this step 178 may not be included, and if brake-system temperature T is even momentarily sensed above third threshold temperature $T_3$ then engine 50 is shut down at step 180. Shutting down engine 50 causes engine 50 to stop operating, which may include stopping the combustion operation of the engine, resulting in no power output from the engine and/or no powered rotation of the transmission and endless track.

In an embodiment, a warning may be issued to the operator before shutting down engine 50. In one such embodiment, the warning may include information regarding when the engine will be shut down, such as after a predetermined period of time that may be the same as the predetermined period of time in step 178. In another embodiment, the warning may be the same as the first and/or second warnings, or may include the first and/or second warnings, as well as an additional third warning, such as a shut-down warning.

After implementing an engine shut-down at step 180, the process may return to step 162 and be repeated.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A vehicle warning and control method for a vehicle having an engine and a brake system, comprising:

sensing a temperature of the brake system of the vehicle;

issuing a first brake-system temperature warning in response to the sensed temperature of the brake system exceeding a first predetermined temperature threshold;

issuing a second brake-system temperature warning in response to the sensed temperature of the brake system exceeding a second predetermined temperature threshold that is higher than the first predetermined temperature threshold; and modifying an operation of the engine to a power-limited mode in response to the temperature of the brake system exceeding the second predetermined temperature threshold.

2. The vehicle warning and control method of claim 1, wherein issuing the first brake-system temperature warning includes causing a display device of the vehicle to display a visible warning.

3. The vehicle warning and control method of claim 1, wherein issuing the first brake-system temperature warning includes issuing one or more of a visual warning, an audible warning and a haptic warning.

4. The vehicle warning and control method of claim 1, wherein the vehicle is a snowmobile.

5. The vehicle warning and control method of claim 1, wherein sensing the temperature of the brake system of the vehicle comprises directly sensing a temperature of a component of the brake system.

6. The vehicle warning and control method of claim 5, wherein a brake-system temperature sensor that is in direct contact with the component of the brake system senses the temperature of the component, the brake-system temperature sensor comprising one or more of a thermistor, a resistance temperature detector, a thermocouple, and a semiconductor-based temperature sensor.

7. The vehicle warning and control method of claim 1, wherein modifying the operation of the engine in response to the temperature of the brake system exceeding the second predetermined temperature threshold includes causing an output power of the engine to be reduced.

8. The vehicle warning and control method of claim 1, further comprising shutting down the engine when the sensed temperature of the brake system is greater than a third predetermined temperature threshold that exceeds the second predetermined temperature threshold.

9. The vehicle warning and control method of claim 1, further comprising transmitting a brake-system temperature signal through a wiring harness of a speed sensor system of the vehicle.

10. A vehicle warning and control method for a vehicle having an engine and a brake system, comprising:

sensing a temperature of the brake system of the vehicle;

determining that the temperature of the brake system is above a first predetermined temperature threshold;

sensing a throttle position or a braking function;

issuing a first brake-system temperature warning in response to the temperature of the brake system exceeding the first predetermined temperature threshold;

determining whether the sensed throttle position or the braking function has been changed by the operator; and issuing a second brake-system temperature warning after a predetermined period of time and after determining whether the throttle position or the braking function has been changed by the operator.

11. The vehicle warning and control method of claim 10, further comprising issuing the second brake-system temperature warning after the predetermined period of time in which the throttle position or the braking function has not been changed by the operator.

12. The vehicle warning and control method of claim 10, further comprising issuing a second brake-system temperature warning after the predetermined period of time and after determining that the throttle position of the engine has not been changed.

13. A warning and control system for a snowmobile, comprising:

a brake-system temperature sensor configured to sense a temperature of a brake system;

a digital memory storage device storing first, second and third temperature threshold data; and an engine control module (ECM) in electrical communication with the brake-system temperature sensor and the digital memory storage device, the ECM including a processor, wherein the ECM is configured to:

compare a received brake-system temperature data signal to the first temperature threshold data and output a first warning command when the brake-system temperature data signal exceeds the first temperature threshold data, compare the received brake-system temperature data signal to the second temperature threshold data and output a first engine control command when the brake-system temperature data signal exceeds the second temperature threshold data, and compare the received brake-system temperature data signal to the third temperature threshold data and output a second engine control command when the brake-system temperature data signal exceeds the third temperature threshold data.

14. The warning and control system of claim 13, wherein the first warning command causes a warning to be displayed on a display device of the snowmobile.

15. The warning and control system of claim 13, wherein the first engine-control command causes power to an engine of the snowmobile to be reduced or limited.

16. The warning and control system of claim 13, wherein the second engine-control command causes an engine of the snowmobile to shut down.

17. A snowmobile including the warning and control system of claim 13.

* * * * *